United States Patent
Van Haaren et al.

(10) Patent No.: US 11,231,143 B2
(45) Date of Patent: Jan. 25, 2022

(54) FIBERWOUND TANKS

(71) Applicant: AMTROL LICENSING INC., West Warwick, RI (US)

(72) Inventors: Christopher A. Van Haaren, Warwick, RI (US); Joseph Jeannotte, Cumberland, RI (US); Christopher Kampf, Chepachet, RI (US); Alexander Goudas, Webster, MA (US)

(73) Assignee: AMTROL LICENSING, INC., West Warwick, RI (US)

( * ) Notice: Subject to any disclaimer, the term of this patent is extended or adjusted under 35 U.S.C. 154(b) by 0 days.

(21) Appl. No.: 16/885,761

(22) Filed: May 28, 2020

(65) Prior Publication Data

US 2020/0292130 A1  Sep. 17, 2020

Related U.S. Application Data

(63) Continuation of application No. 15/270,987, filed on Sep. 20, 2016, now Pat. No. 10,724,684.

(51) Int. Cl.
*F17C 1/16* (2006.01)
*F17C 1/06* (2006.01)
(Continued)

(52) U.S. Cl.
CPC ............... *F17C 1/16* (2013.01); *F15B 1/106* (2013.01); *F16J 12/00* (2013.01); *F17C 1/06* (2013.01);
(Continued)

(58) Field of Classification Search
CPC ............... F17C 1/16; F17C 2201/0109; F17C 2203/0604; F17C 2203/0673; F17C 2205/0302; F17C 2209/221; F17C 1/06; F15B 1/106; F15B 1/14; F15B 1/22; F15B 2201/3151; F15B 2201/205; F15B 2201/605; F16J 12/00; F24D 3/1016
(Continued)

(56) References Cited

U.S. PATENT DOCUMENTS 3,047,191 A   7/1962  Young
3,524,475 A *  8/1970  Kirk, Jr. ................. F15B 1/08
                                                   138/30
(Continued)

FOREIGN PATENT DOCUMENTS

DE   102009014057   9/2010
EP   1855046        11/2007
(Continued)

*Primary Examiner* — J. Gregory Pickett
*Assistant Examiner* — Niki M Eloshway
(74) *Attorney, Agent, or Firm* — Tucker Ellis LLP; Carlos Garritano

(57) ABSTRACT

A fluid tank includes polymeric liner comprising an upper wall and a lower wall. The upper wall and the lower wall define a cavity therebetween. A weld joint joins the upper and lower walls together. A method for assembling a fluid tank includes overlapping surfaces of an upper wall and a lower wall to form a liner defining a cavity. The method includes joining the surface of the upper wall and the surface of the lower wall together by welding to form a weld joint between the upper wall and the lower wall. The method can include cooling the weld joint to control warpage of the liner at the weld joint.

19 Claims, 6 Drawing Sheets

(51) Int. Cl.
*F16J 12/00* (2006.01)
*F15B 1/10* (2006.01)
*F24D 3/10* (2006.01)
*F15B 1/14* (2006.01)
*F15B 1/22* (2006.01)

(52) U.S. Cl.
CPC .............. *F24D 3/1016* (2013.01); *F15B 1/14* (2013.01); *F15B 1/22* (2013.01); *F15B 2201/205* (2013.01); *F15B 2201/3151* (2013.01); *F15B 2201/4053* (2013.01); *F15B 2201/4056* (2013.01); *F15B 2201/605* (2013.01); *F15B 2201/615* (2013.01); *F17C 2201/0109* (2013.01); *F17C 2201/0185* (2013.01); *F17C 2203/0604* (2013.01); *F17C 2203/066* (2013.01); *F17C 2203/0619* (2013.01); *F17C 2203/0663* (2013.01); *F17C 2203/0673* (2013.01); *F17C 2205/0302* (2013.01); *F17C 2209/221* (2013.01)

(58) Field of Classification Search
USPC .......................................... 220/589, 586, 592
See application file for complete search history.

(56) References Cited

U.S. PATENT DOCUMENTS

| | | |
|---|---|---|
| 4,165,951 A | 8/1979 | Friedman et al. |
| 4,241,843 A | 12/1980 | Walker et al. |
| 4,313,400 A | 2/1982 | Walker et al. |
| 4,337,824 A | 7/1982 | Kirk |
| 4,344,645 A | 8/1982 | Kirk |
| 4,386,409 A | 5/1983 | Petroff |
| 4,403,385 A | 9/1983 | Kirk |
| 4,471,907 A | 9/1984 | Gerstmann |
| 4,546,819 A | 10/1985 | O'Connor |
| 4,579,242 A | 4/1986 | Ellis |
| 4,921,214 A | 5/1990 | Jernberg |
| 5,046,638 A | 9/1991 | Wolf |
| 5,111,879 A | 5/1992 | Jozwiak et al. |
| 5,368,073 A | 11/1994 | Murphy |
| 5,386,925 A | 2/1995 | Lane |
| 5,551,590 A | 9/1996 | Mazur et al. |
| 5,657,790 A | 8/1997 | Mohn |
| 5,691,406 A | 11/1997 | Lane et al. |
| 5,758,820 A | 6/1998 | Celorier, Jr. |
| 5,778,679 A | 7/1998 | Celorier, Jr. |
| 5,794,660 A | 8/1998 | Mohn |
| 6,957,799 B2 | 10/2005 | Heilmann et al. |
| 7,032,628 B2 | 4/2006 | Guillemette et al. |
| 7,048,861 B2 | 5/2006 | Beretta et al. |
| 7,100,683 B2 | 9/2006 | Heilmann et al. |
| 7,216,673 B2 | 5/2007 | Gremour et al. |
| 7,287,663 B2 | 10/2007 | Vandal et al. |
| 7,671,754 B2 | 3/2010 | Heilmann et al. |
| 7,699,188 B2 | 4/2010 | Oliveira et al. |
| 7,935,206 B2 | 5/2011 | Oliveira et al. |
| 8,215,517 B2 | 7/2012 | Chohfi |
| 8,403,170 B1 | 3/2013 | Lai |
| 8,739,823 B2 | 6/2014 | Van Haaren et al. |
| 8,919,598 B2 | 12/2014 | Kampf et al. |
| 8,944,278 B2 | 2/2015 | Chohfi et al. |
| 9,751,689 B2 | 9/2017 | Dinovo |
| 2004/0099695 A1 | 5/2004 | Finn |
| 2006/0000839 A1 | 1/2006 | Gremour et al. |
| 2006/0131314 A1* | 6/2006 | Lombari ............... F24D 3/1008 220/721 |
| 2006/0144843 A1 | 7/2006 | Vandal et al. |
| 2009/0071965 A1 | 3/2009 | Lida |
| 2010/0084408 A1 | 4/2010 | Wang |
| 2014/0158573 A1 | 6/2014 | Van Haaren |
| 2015/0102026 A1 | 4/2015 | Parola |
| 2015/0240993 A1 | 8/2015 | Delay |
| 2015/0345802 A1* | 12/2015 | Van Haaren ............. G01M 3/00 220/721 |
| 2018/0080607 A1* | 3/2018 | Van Haaren ............. F16J 12/00 |
| 2018/0135658 A1* | 5/2018 | Benettolo ................ F15B 1/22 |
| 2018/0156388 A1 | 6/2018 | Kampf |
| 2019/0085536 A1* | 3/2019 | Wideman ................ E03B 11/06 |
| 2019/0113054 A1* | 4/2019 | Wideman ................ F15B 1/106 |

FOREIGN PATENT DOCUMENTS

| | | |
|---|---|---|
| JP | 10332084 | 12/1998 |
| WO | 8705261 | 9/1987 |
| WO | 2005113346 | 12/2005 |
| WO | 2015183933 | 12/2015 |

\* cited by examiner

FIBERWOUND TANKS

CROSS-REFERENCE TO RELATED APPLICATION(S)

This application is a continuation of U.S. patent application Ser. No. 15/270,987, filed Sep. 20, 2016 entitled "FIBERWOUND TANKS," the disclosure of which is incorporated herein by reference in its entirety.

BACKGROUND

1. Field of the Invention

The present invention generally relates to well and expansion tanks and, more particularly, to fiberwound well and expansion tanks.

2. Description of Related Art

Many well and expansion tanks use a diaphragm or bladder to separate air from water. An air charge pressure on one side keeps the diaphragm/bladder at a distance away from the inside wall of the tank in the air dome. When the tank is installed onto a water system, the water system pressure pushes back against the diaphragm/bladder, compressing the air. The proper pre-charge will continue to keep the diaphragm/bladder away from the tank wall. If the pre-charge pressure is not enough to provide an air volume appropriate for the water supply pressure, the diaphragm/bladder will fill the air cell. If eventually the diaphragm/bladder "bottoms out" on the tank wall, the tank becomes ineffective in the function it has been design to provide. An example of a non-metallic conventional expansion tank assembly is provided in commonly assigned U.S. Pat. No. 7,216,673 to Gremour et al. Gremour et al. discloses a non-metallic, diaphragm-type tank assembly for use with a pressurized water system. The disclosure of U.S. Pat. No. 7,216,673 to Gremour et al. is incorporated by reference herein in its entirety.

One type of such tank is called a Type IV Fiberwound tank. The industry defines this tank as having a plastic liner with fiberwinding around the liner. Traditional Type IV fiberwound tanks have been considered satisfactory for their intended purpose, however, there is ongoing need in the art for improved Type IV Fiberwound tanks.

SUMMARY

A fluid tank includes polymeric liner comprising an upper wall and a lower wall. The upper wall and the lower wall define a cavity therebetween. A weld joint joins the upper and lower walls together.

In accordance with some embodiments, the fluid tank includes a backing ring inboard from the upper wall with respect to the cavity to provide support for the upper wall and the lower wall during welding. The weld joint can be an infrared (IR) weld joint. The upper wall can include an upper dome and a dome and/or cylindrical extension. The upper wall can include a second weld joint defined between the upper dome and the dome and/or cylindrical extension bonding the upper dome and the dome and/or cylindrical extension together. The weld joint can be defined on the dome and/or cylindrical extension of the upper wall.

It is contemplated that the fluid tank can include flexible diaphragm positioned within the cavity connected to an inner diameter surface of the lower wall. The diaphragm can separate the cavity into an upper portion and a lower portion. The upper portion of the cavity can be sealed to contain a pressurized gas and the lower portion can be sealed to contain a pressurized fluid. The fluid tank can include an inner hoop ring operatively connected to an inner surface of the flexible diaphragm to hold the flexible diaphragm in place against the lower wall. The lower wall can include a hoop groove that mates with the inner hoop ring to hold the flexible diaphragm therebetween. The fluid tank can include an outer band having a hoop groove operatively connected to an outer diameter of the lower wall. The hoop groove of the lower wall mates with the hoop groove of the outer band.

In accordance with some embodiments, the fluid tank includes a fiber winding layer around an outer surface of the liner. The fiber winding layer includes a preliminary fiber winding layer and an outer fiber winding layer. The preliminary fiber winding layer can be wrapped around the outer surface of the liner underneath the outer fiber winding layer to contain liner growth due to heat generated during wrapping of the outer fiber winding layer. The liner can define a longitudinal liner axis. The preliminary and outer fiber winding layers can be formed of fiber windings helically and circumferentially wrapped with respect to the longitudinal liner axis around the outer surface of the liner. The fiber winding layer surrounding the weld joint can be thicker than the fiber winding layer surrounding the remainder of the liner to reduce stress in the weld joint.

It is contemplated that the liner can include an opening with a connector positioned therein. The connector can include a connector housing having a central collar that defines a longitudinal axis and a skirt that extends radially outward therefrom. The central collar can define an axial passage and includes a circumferential groove around its periphery for receiving fiber windings during wrapping on to the liner. The connector can include a threaded member in the axial passage. The threaded member can project outward from a first side of the connector housing. The skirt of the connector housing can include an interface surface spin welded to an interior surface of the liner. The interface surface can include axially facing annular grooves defined therein configured to be spin welded to an interior surface of a fluid tank for added support of liner from internal tank pressure. The connector can include an annular ring with a combined diaphragm support and turbulator operatively connected to a second side of the connector housing opposite from the threaded member.

In accordance with another aspect, a connector for a fluid tank includes a polymeric housing, similar to connector housing described above, and a threaded member in the axial passage of the housing, similar to the threaded member described above.

In accordance with yet another aspect, a method for assembling a fluid tank includes overlapping surfaces of an upper wall and a lower wall to form a liner defining a cavity. The method includes joining the surface of the upper wall and the surface of the lower wall together by welding to form a weld joint between the upper wall and the lower wall. The method can include cooling the weld joint to control warpage of the liner at the weld joint.

In accordance with some embodiments, upper and lower walls are at least partially cylindrical. The respective surfaces of the upper and lower walls can each define a circular perimeter. The weld joint can be an IR weld joint. Joining the surface of the upper wall and the surface of the lower wall can include using an IR emitter to apply heat circumferentially around the overlapping surfaces of the upper wall and the lower wall. Using the IR emitter to apply heat circumferentially around the overlapping surfaces of the upper wall and the lower wall can include rotating the liner around its longitudinal axis relative to the IR emitter.

It is contemplated that the method can include wrapping the liner with the fiber winding layer around the outer surface of the liner. Wrapping the liner with the fiber winding layer can include flame treating at least one of the liner or the fiber winding layer. Wrapping the liner with the fiber winding layer can include applying an adhesive between the outer surface of the liner and the fiber winding layer to create a bond between the fiber winding layer and the outer surface of the liner. Wrapping the liner with the fiber winding layer can include wrapping the preliminary fiber winding layer around the outer surface of the liner to contain liner growth due to heat generated during wrapping of the outer fiber winding layer. Wrapping the liner with a fiber winding layer can include wrapping the preliminary fiber winding layer and the outer fiber winding layer helically and circumferentially with respect to the longitudinal liner axis around the outer surface of the liner. The method can include heat treating the polymeric liner assembly.

In accordance with another aspect, a fluid tank includes a polymeric liner comprising an upper wall and a lower wall. The upper wall and the lower wall define a cavity therebetween. The upper wall includes an upper dome and a dome and/or cylindrical extension to provide increased volume and structural support to the polymeric liner. An end of the dome and/or cylindrical extension of the upper wall is joined to the lower wall and an end of the upper dome of the upper wall is joined to the dome and/or cylindrical extension. In accordance with some embodiments, a weld joint joins the upper and lower walls together. The weld joint can be defined between dome and/or cylindrical extension of the upper wall and the lower wall. The upper wall can include a second weld joint defined between the upper dome and the dome and/or cylindrical extension bonding the upper dome and the dome and/or cylindrical extension together.

These and other features of the systems and methods of the subject invention will become more readily apparent to those skilled in the art from the following detailed description of the embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, embodiments thereof will be described in detail herein below with reference to certain figures, wherein.

DETAILED DESCRIPTION

Figure 1:
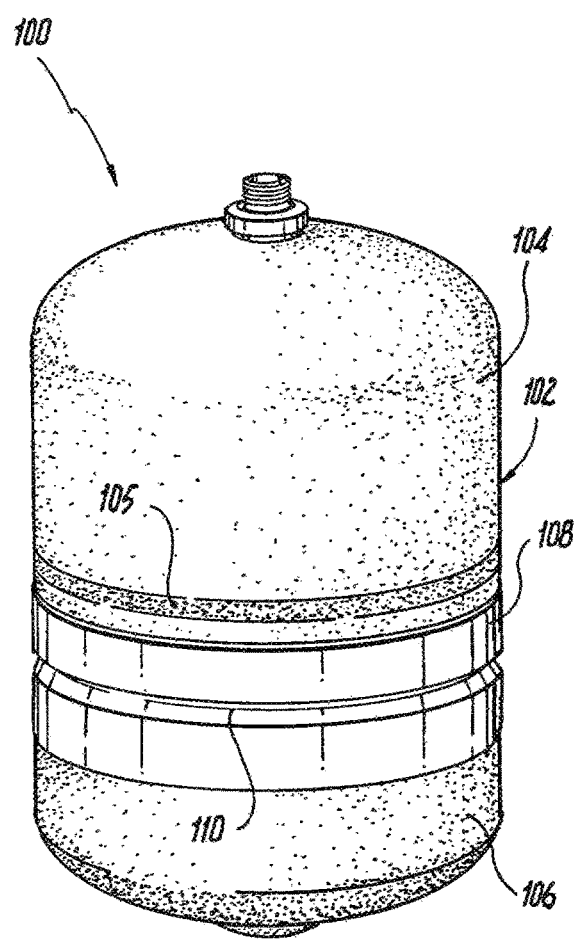
FIG. 1. is a perspective view of a portion of an embodiment of a fluid tank constructed in accordance with the present disclosure, showing upper and lower walls of the liner welded together.

Reference will now be made to the drawings wherein like reference numerals identify similar structural features or aspects of the subject invention. For purposes of explanation and illustration, and not limitation, a partial view of an exemplary embodiment of the fluid tank in accordance with the invention is shown in FIG. 1 and is designated generally by reference character 100. Other embodiments of the fluid tank 100 in accordance with the invention, or aspects thereof, are provided in FIGS. 2-8 as will be described.

Figure 2:
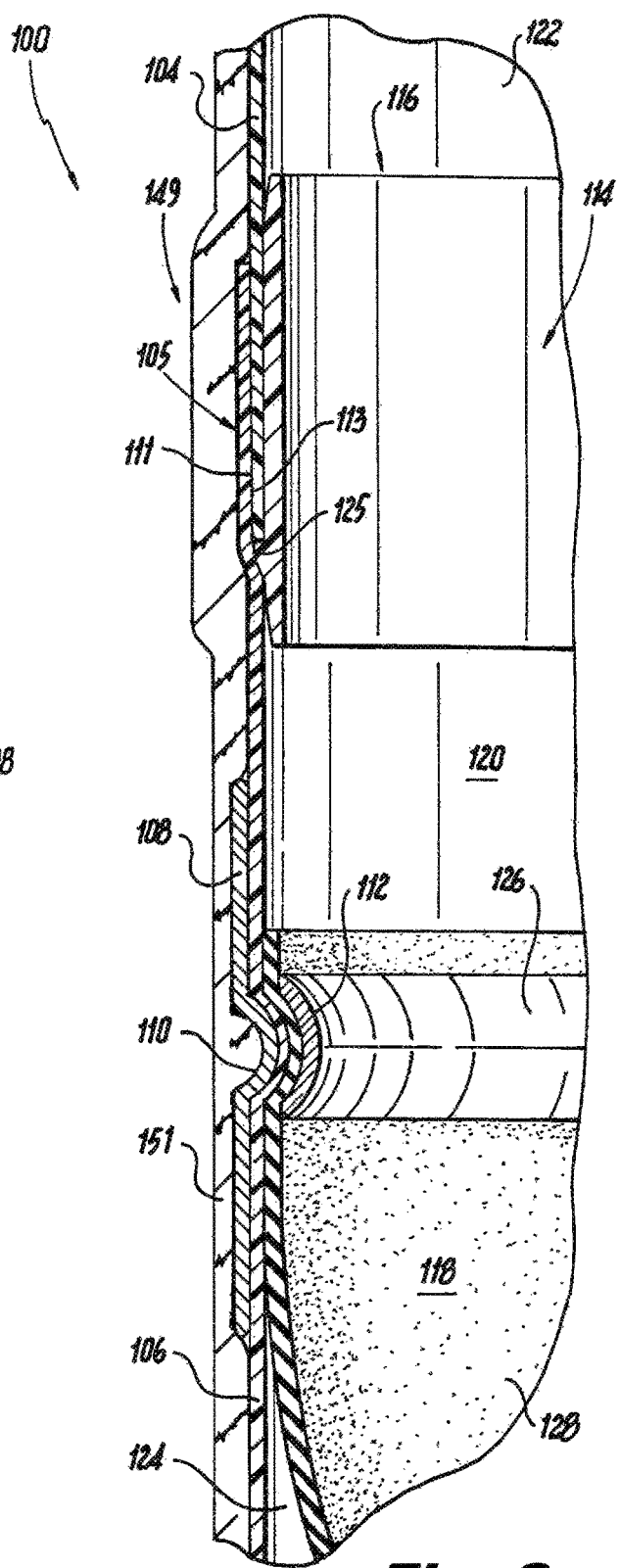
FIG. 2 is a cross-sectional view of a portion of the fluid tank of FIG. 1, showing the backing ring and the flexible diaphragm positioned within the cavity connected to an inner diameter surface of the lower wall.

As shown in FIGS. 1 and 2, fluid tank 100 includes polymeric liner 102 comprising an upper wall 104 and a lower wall 106. Polymeric liner 102 can be a thermoplastic liner, for example. Upper wall 104 and lower wall 106 define a cavity 114 therebetween. Fluid tank 100 is an expansion tank, e.g. a Type IV fiberwound tank. Liner 102 can be made from a variety of polymeric materials, for example, high-density polyethylene (HDPE). HDPE provides permeation resistance against air leaving inside liner 102 from cavity 114 and air precharge in an upper portion 122 being lost through liner 104. A weld joint 105 joins upper and lower walls, 104 and 106, respectively, to form a hermetically sealed joint therebetween. Upper and lower walls, 104 and 106, respectively, are joined at their respective surfaces, 111 and 113. Surfaces 111 and 113 are located proximate to the ends of their respective upper and lower walls, 104 and 106. Weld joint 105 is an infrared (IR) weld joint 105, for example, or a variety of other suitable weld joints. Fluid tank 100 includes a backing ring 116 inboard from upper wall 104 with respect to cavity 114 to provide support for upper wall 104 and lower wall 106 during welding as well as provide heat sink for the IR weld. It is contemplated that backing ring 116 can be made from a polymeric material of a darker color than liner 102. The darker color provides a heat sink for the IR radiation such that radiation created by IR welding is absorbed in the backing ring 116 and resists and/or avoids raising the temperature in cavity 114, concentrating IR heat radiation mostly into the overlapping surfaces 111 and 113. Surface 111 is an outer diameter surface of upper wall 104 and surface 113 is an inner diameter of lower wall 106. Backing ring 116 also naturally assists weld joint 105 to cool more rapidly by conducting heat away from weld joint 105. Backing ring 116 also provides leading edges of upper and lower walls, 104 and 106, respectively, with position locators or stops 125 that aid in the assembly of upper and lower walls, 104 and 106. Infrared weld benefits include providing a fast, localized and controlled method of heat input, and the ability to join parts in situ. Other joining methods require parts to be apart (adhesive) or moving (spin welding). Additionally, final part location and position can be controlled more precisely with IR welding. The localized and controlled method of heat transfer by radiation creates a weld zone where material from both parts can mix, weld, and cool so that material properties are left intact, providing weld joint 105 with strength similar to the original material.

As shown in FIG. 2, fluid tank 100 includes an outer band 108 having a hoop groove 110 operatively connected to an outer diameter of lower wall 106. Lower wall 106 includes a hoop groove 112 that mates with hoop groove 110 of outer band 108. Fluid tank 100 includes flexible diaphragm 118 positioned within cavity 114 connected to an inner diameter surface 120 of lower wall 106. Diaphragm 118 separates cavity 114 into upper portion 122 and a lower portion 124. Upper portion 122 of cavity 114 is sealed to contain a pressurized gas and lower portion 124 is sealed to contain a pressurized fluid. Fluid tank 100 includes an inner hoop ring 126 operatively connected to an inner surface 128 of flexible diaphragm 118 to hold flexible diaphragm 118 in place against lower wall 106. Hoop groove 110 of outer band 108 mates with hoop groove 112 of lower wall, and hoop groove 112 mates with inner hoop ring 126 to pinch flexible diaphragm 118 between the hoop groove 112 of lower wall and inner hoop ring 126. It is contemplated that outer band 108 and inner hoop ring 126 are made from a metallic material, e.g. steel.

With continued reference to FIG. 2, tank 100 includes a fiber winding layer 151. Fiber winding layer 151 can, for example, be a thermoplastic fiber winding layer. A portion 149 of fiber winding layer 151 surrounding weld joint 105 is thicker than fiber winding layer 151 surrounding the remainder of the liner 102. Thicker portion 149 is due to additional circumferential wraps added around weld joint 105 for additional support against internal pressure and cycling.

Figure 3:
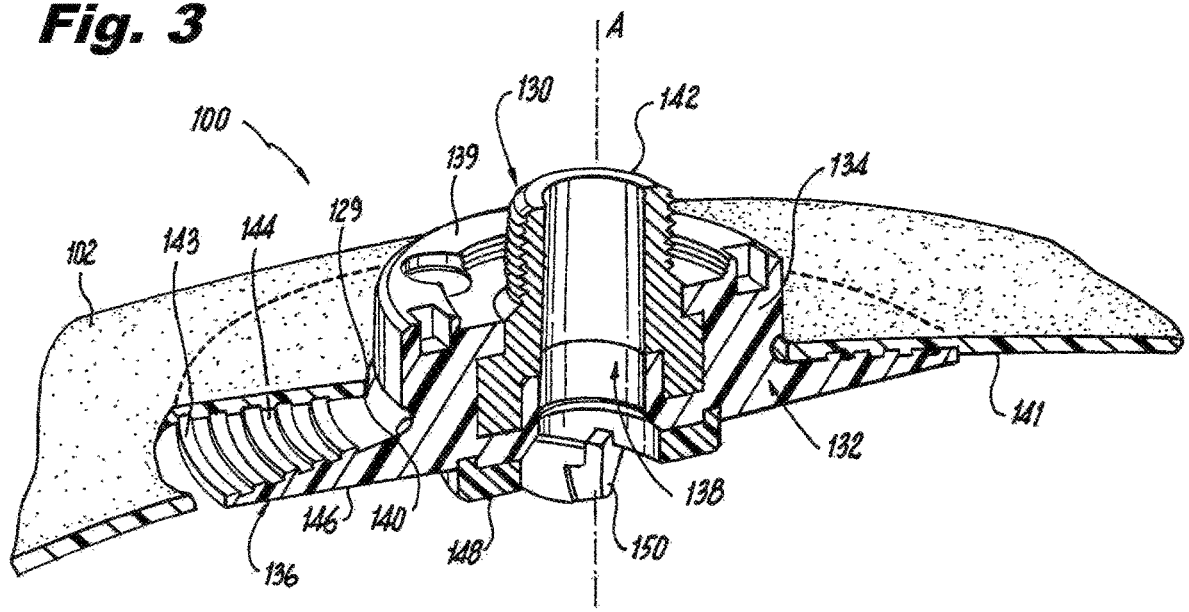
FIG. 3 is a perspective cross-sectional view of an embodiment of a connector for the fluid tank of FIG. 1 constructed in accordance with the present disclosure.

As shown in FIG. 3, liner 102 includes an opening 129 with a connector 130 positioned therein. Connector 130 includes a connector housing 132 having a central collar 134 that defines a longitudinal axis A and a skirt 136 that extends radially outward therefrom. Central collar 134 defines an axial passage 138 and includes a circumferential groove 140 around its periphery for receiving fiber windings during assembly into liner 102 for the purpose of locking connector 130 into the composite fiber matrix. Circumferential groove 140 allows the fiber windings of fiber winding layer 151 into and under connector 130 to provide support against the inward force of connector 130 into tank 100. Without circumferential groove 140, connector 130 may be pushed inward causing separation from the inner layer of fiber. Connector 130 includes a threaded member 142 in axial passage 138. Threaded member 142 may be insert molded with connector housing 132 and/or can also be made from a stronger material, if needed, more suited for a threaded fitting. Threaded member 142 projects outward from a first side 139 of connector housing 132 can act as a threaded plumbing connection. Skirt 136 of connector housing 132 includes an interface surface 143 spin welded to an interior surface 141 of liner 102. Prior to spin welding, interface surface 143 includes annular grooves 144 defined therein to assist in the spin welding to interior surface 141. Connector 130 includes an annular ring 148 with a combined diaphragm support and turbulator 150 operatively connected to a second side 146 of connector housing 132 opposite from threaded member 142 to support a pressurized diaphragm and mix water flow.

Figure 4A:
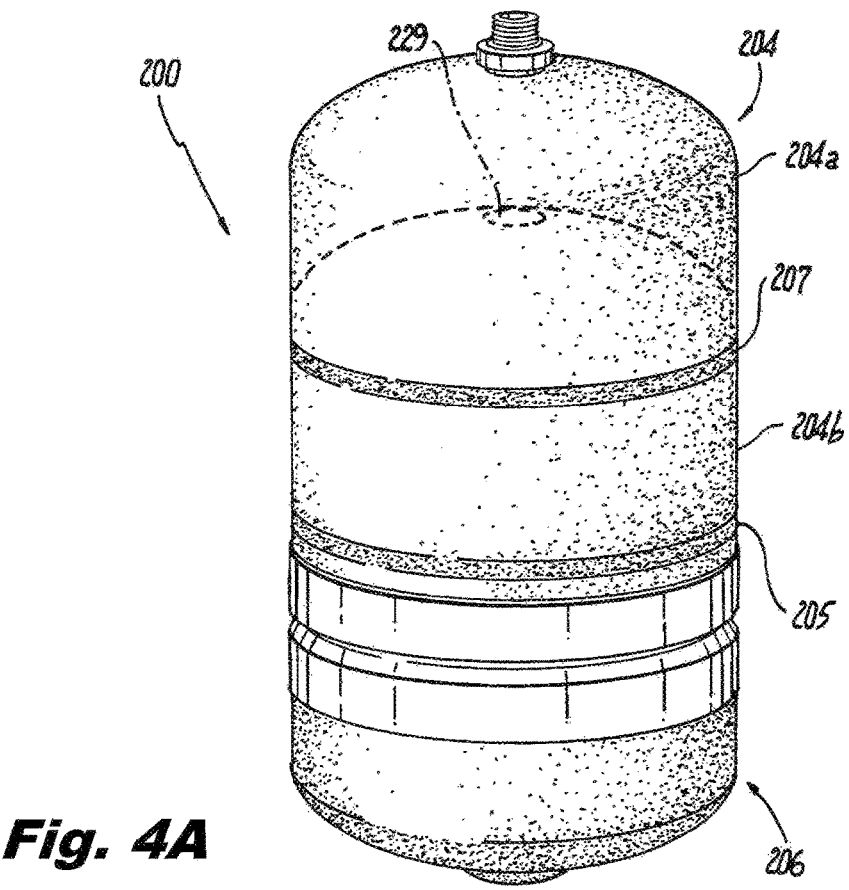
FIG. 4A is a perspective view of a portion of another embodiment of a fluid tank constructed in accordance with the present disclosure, showing the upper wall including a dome extension portion.

With reference now to FIG. 4A, another embodiment of a fluid tank 200 is shown. Fluid tank 200 is substantially similar to fluid tank 100 and includes upper and lower walls 204 and 206, respectively. Upper and lower walls 204 and 206, respectively, are joined at a weld joint 205. In this embodiment, upper wall 204 of fluid tank 200 includes an upper dome 204a and a dome extension 204b. Dome extension 204b is similar to upper wall 104 and upper dome 204a, except that dome extension 204b includes an opening 229 without a connector, e.g. connector 130. Upper dome 204a is assembled onto the top of dome extension 204b and the open end of upper dome 204a, e.g. the bottom of upper dome 204a as oriented in FIG. 4, is IR welded to the tangent side wall of dome extension 204b at a second weld joint 207 to bond upper dome 204a and dome extension 204b together to form upper wall 204. Dome extension 204b allows for tank 200 to have additional volume but also acts as a rib support to provide internal structural support, e.g. increased stiffness, for fluid tank 200. This allows the walls of tank 200 to be thinner than a tank, for example, with a cylindrical extension portion. Moreover, it increases the ease of manufacturing as the dome extension 204b utilizes essentially the same part as upper dome 204a.

With continued reference to FIG. 4A, in accordance with certain embodiments, weld joint 207 can also include a backing ring, similar to backing ring 116, to provide support for the weld joint 207, as described above with respect to backing ring 116. Upper dome 204a is similar to upper wall 104. For tank 200, a first weld joint 205 is defined between dome extension 204b of upper wall 204 and lower wall 206. Those skilled in the art will readily appreciate that any suitable number of dome extensions and corresponding weld joints can be used depending on the desired fluid tank volume.

Figure 4B:
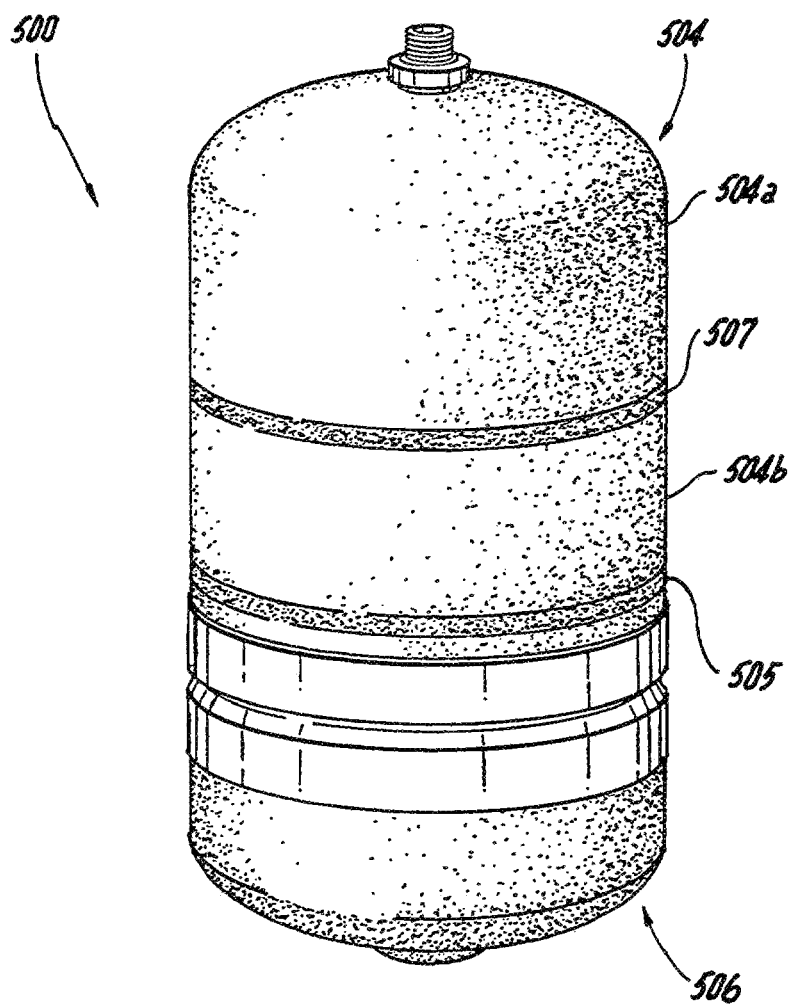
FIG. 4B is a perspective view of a portion of another embodiment of a fluid tank constructed in accordance with the present disclosure, showing the upper wall including a cylindrical extension portion.

As shown in FIG. 4B, another embodiment of a fluid tank 500 is shown. Fluid tank 500 is substantially similar to fluid tanks 100 and 200 and includes upper and lower walls 504 and 506, respectively. Upper and lower walls 504 and 506, respectively, are joined at a weld joint 505. In this embodiment, upper wall 504 of fluid tank 500 includes an upper dome 504a and a cylindrical extension 504b. Upper dome 504a is assembled onto the top of cylindrical extension 504b and the open end of upper dome 504a, e.g. the bottom of upper dome 504a as oriented in FIG. 4B, is IR welded to the tangent side wall of cylindrical extension 504b at a second weld joint 507 to bond upper dome 504a and cylindrical extension 504b together to form upper wall 504. Cylindrical extension 504b allows for tank 500 to have additional volume. Fluid tank 500 is similar to tank 200 and can include a backing ring and one or more weld joints, as described above. Those skilled in the art will readily appreciate that any suitable number of cylindrical and/or dome extensions and corresponding weld joints can be used depending on the desired fluid tank volume.

Figure 5:
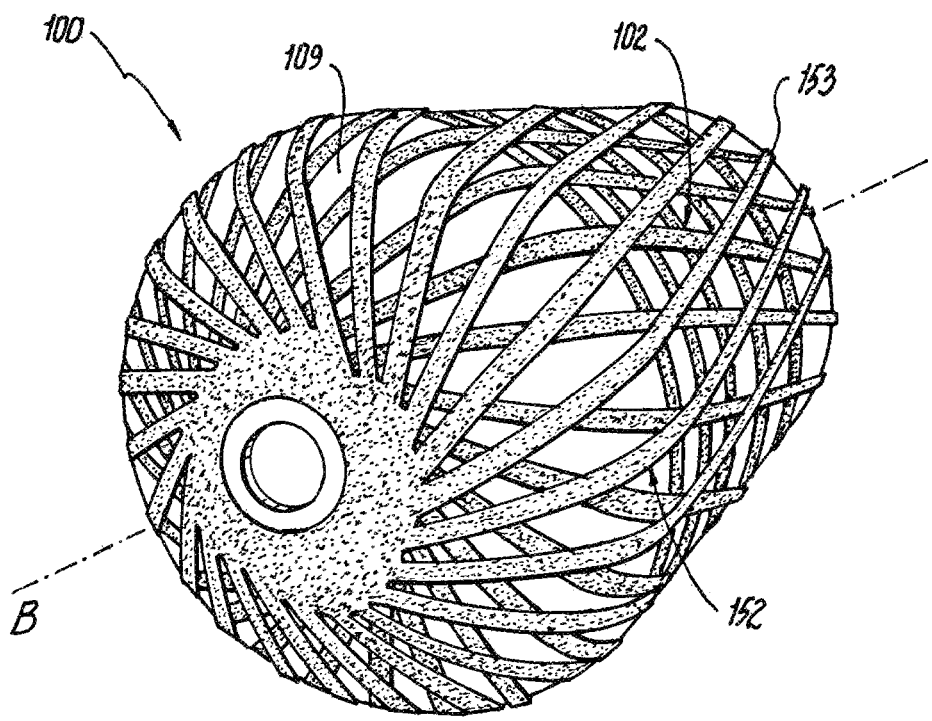
FIG. 5 is a perspective view of the fluid tank of FIG. 1, showing the fluid tank with preliminary circumferential and helical fiber windings around the outer surface of the liner.
Figure 6:
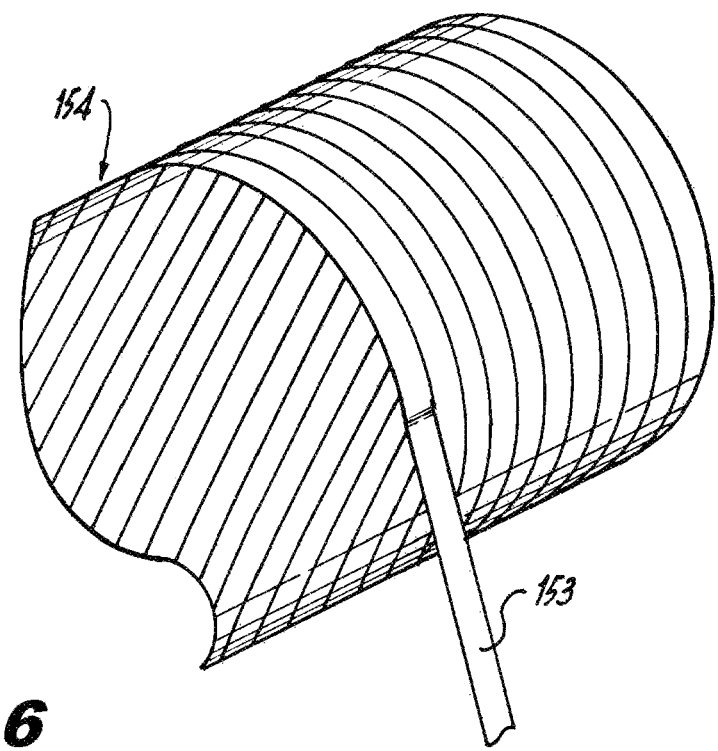
FIG. 6 is a perspective view of the fluid tank of FIG. 1, showing the fluid tank with helically and circumferentially wrapped outer fiber windings around the outer surface of the liner.

A shown in FIGS. 5 and 6, fiber winding layer 151, shown in FIG. 2, includes a preliminary fiber winding layer 152, also called a skeleton winding, wrapped around an outer surface 109 of liner 102. Preliminary fiber winding layer 152 includes multiple layers of fiber windings 153 that are helically and circumferentially wrapped with respect to a longitudinal axis B of liner 102. Fiber winding layer 151 includes an outer fiber winding layer 154 around outer surface 109 of liner 102 and over preliminary fiber winding layer 152. Outer fiber winding layer 154 is formed of multiple layers of fiber windings 153 that are helically and circumferentially wrapped with respect to longitudinal axis B of liner 102. FIG. 5 shows preliminary winding layer 152 in place on outer surface 109. FIG. 6 shows tank 100 with outer fiber winding layer 154 mid-wrap, e.g. outer surface 109 has been helically wrapped and the circumferential wrapping is in process. Preliminary fiber winding layer 152 is underneath outer fiber winding layer 154 to contain liner growth due to heat generated during wrapping of outer fiber winding layer 154. Those skilled in the art will readily appreciate that fiber winding layer 151, as described above, can also be used on tank 200.

Figure 7:
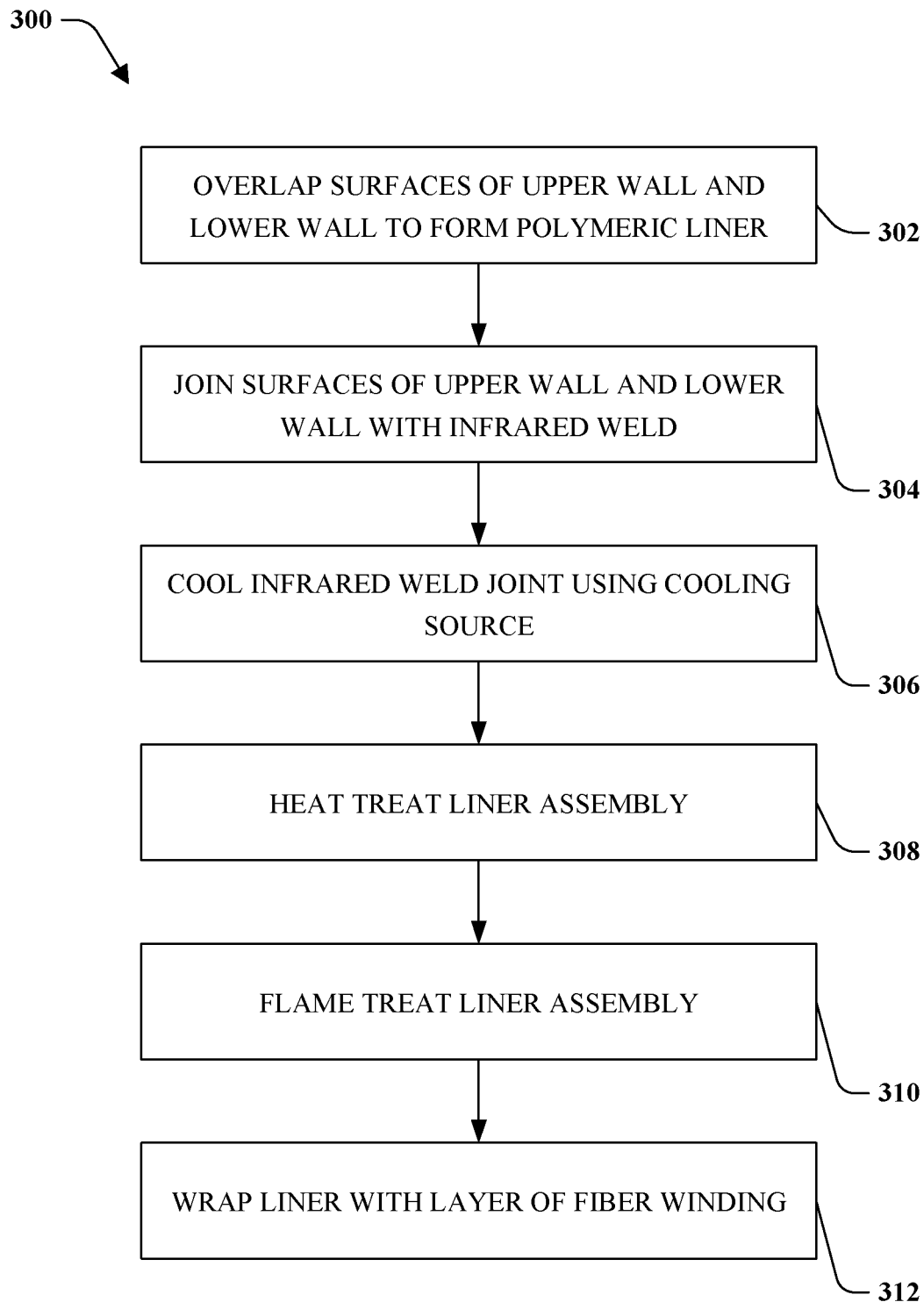
FIG. 7 is a flowchart of an exemplary method for assembling a fluid tank in accordance with an embodiment of the present disclosure, showing operations joining the liner together.

As shown in FIG. 7, a method 300 for assembling a fluid tank, e.g. fluid tank 100, includes overlapping surfaces, e.g. surfaces 111 and 113, of an upper wall, e.g. upper wall 104, and a lower wall, e.g. lower wall 106, respectively, to form a polymeric liner, e.g. liner 102, defining a cavity, e.g. cavity 114, as indicated by box 302. It is contemplated that the fit between the overlapping surfaces of the liner walls is surface-to-surface with intimate contact. Those skilled in the art will readily appreciate that if the upper wall includes an extension, e.g. dome extension 204*b*, as described above, the surfaces of the dome extension will be overlapped with the surface of the lower wall.

Figure 8:
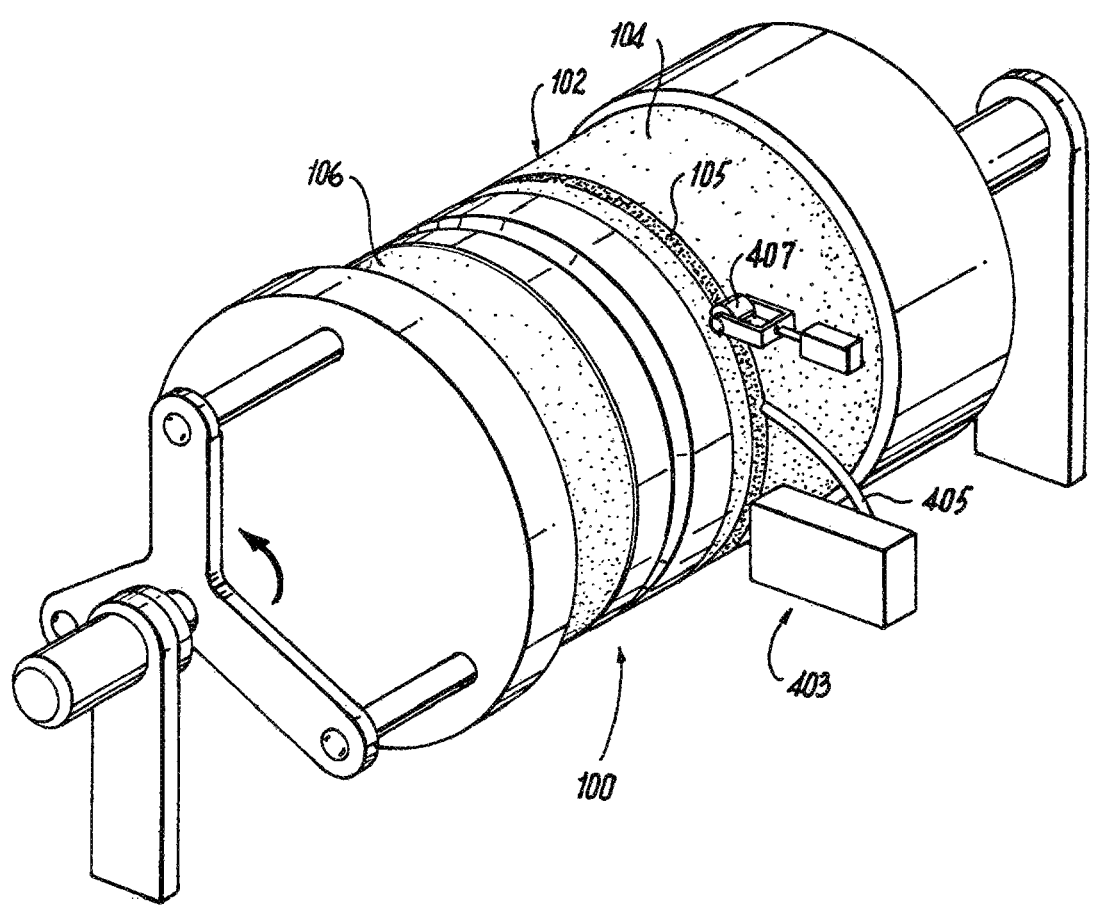
FIG. 8 is a perspective view of the fluid tank of FIG. 1 in an assembly system constructed in accordance with the present disclosure, showing an IR emitter and a cooling source.

With reference now to FIGS. 7 and 8, method 300 includes joining the surface of the upper wall and the surface of the lower wall together using an infrared (IR) weld to form a weld joint, e.g. weld joint 105, between the upper and lower wall, as indicated by box 304. Joining the surfaces of the upper wall and the lower wall includes using an IR emitter 403 to apply heat circumferentially around the overlapping surfaces. In this embodiment, IR heat is focused at a small area on the circumference of the overlapping surfaces, through the lower wall, e.g. the top layer in the overlap, and into the upper wall, e.g. the bottom layer in the overlap, to cause the top and bottom layers to melt together. The overlap results in a certain length of open end of each layer to be beyond the weld joint because if an open end is too close to the weld joint, the heat from the weld will cause the liner edge to distort and lift off the welded area. Those skilled in the art will readily appreciate that in other embodiments, the upper wall can overlap the lower wall, e.g. the IR heat would be directed through the upper wall to the lower wall. Using the IR emitter to apply heat circumferentially around the overlapping surfaces of the upper wall and the lower wall includes rotating the liner around its longitudinal axis relative to IR emitter 403. The timing of the liner rotation can be times as to not have the IR heat focused on one area too long. As the liner is rotated under IR emitter 403, the IR heat is sufficient to bring the temperature of the HDPE material to beyond its melting point just enough to melt the material but before it flows as a liquid. Method 300 also includes applying mechanical compression to the weld joint to ensure that the upper and lower walls melt together during cooling. A backing ring, e.g. backing ring 116, provides support during this compression. The backing ring also provides a heat sink to draw the heat through the liner material and into the backing ring so that heat does not conduct further into the liner causing it to overheat or warp, inconsistent cooling, and/or poor joint material integrity.

With continued reference to FIGS. 7 and 8, method 300 includes cooling the weld joint using a cooling source 405, e.g. a cold air source, to prevent warpage and distortion of the liner, as indicated by box 306. Cooling source 405 is circumferentially offset from IR emitter 403 so that as the liner is rotated, the overlapping surfaces are heated by the IR emitter to form the weld joint and then cooled as a given section of the liner is rotated past cooling source 405. A pressure roller 407 is circumferentially offset from cooling source 405 to apply pressure to weld joint 105 after cooling. Being a thermoplastic, the HDPE can be reheated and cooled without sacrificing structural integrity. Those skilled in the art will readily appreciate that cooling source 405 can be a constant circulation of air or water over the outer surface of the liner, and/or can include contact with a heat conducting material, or the like.

As shown in FIGS. 7 and 8, in accordance with some embodiments, method 300 includes flame treating at least one of the liner and/or fiber windings in order to assist with the adhesion of the fiber windings to the liner, as indicated by box 310. Flame treating is made to the external plastic liner before it is fiberwound and/or to the thermoplastic fiber composite windings just prior to winding onto the liner surface. Flame treating the liner tends to reduce the surface tension so that adhesive and/or melting of heated plastic is adheres more readily. Flame treating of the thermoplastic fiber composite windings just prior to it winding onto the liner surface also aids in adhesion of the fiber to the liner. Method 300 includes heat treating the liner assembly prior to flame treating, as indicated by box 308. Heat treating the liner causes the liner material to contract when cooled so that when winding fiber, the liner doesn't shrink under the heat of the winding, e.g. the liner is pre-shrunk.

With continued reference to FIGS. 7 and 8, method 300 includes wrapping the liner with a fiber winding layer, e.g. fiber winding layer 149, around an outer surface, e.g. outer surface 109, of the liner, as indicated by box 312. Wrapping the liner with the fiber winding layer includes wrapping a preliminary fiber winding layer, e.g. preliminary fiber winding layer 152, around the outer surface of the liner to contain liner growth due to heat generated during wrapping of an outer fiber winding layer, e.g. outer fiber winding layer 154. Wrapping the liner with the fiber winding layer includes wrapping the preliminary fiber winding layer and the outer fiber winding layer helically and circumferentially with respect to the longitudinal liner axis around the outer surface of the liner, as described above with reference to FIGS. 5 and 6. Method 300 also includes adding additional fiber windings around the weld joint for reinforcement.

The methods and systems of the present invention, as described above and shown in the drawings, provide for fluid tanks with superior properties including reduced manufacturing costs, improved durability, greater impact resistance, and improved performance in outdoor environments. While the apparatus and methods of the subject invention have been shown and described with reference to certain embodiments, those skilled in the art will readily appreciate that changes and/or modifications may be made thereto without departing from the spirit and scope of the subject invention.

What is claimed is:

1. A fluid tank, comprising:
    a polymeric liner including an upper wall having an opening and a lower wall, the upper wall and the lower wall defining a cavity therebetween, a portion of the upper wall being inboard the lower wall forming overlapping surfaces;
    a connector positioned in the opening, the connector including a connector housing having a central collar that defines a longitudinal axis and a skirt inboard from the upper wall that extends radially outward from the central collar;
    an infared (IR) weld joint that joins the overlapping surfaces of the upper wall and lower wall;

a spin weld joint that joins an interface surface of the skirt to an interior surface of the upper wall, wherein the interface surface of the skirt extends radially outward from the central collar, and wherein the interface surface of the skirt includes axially facing and concentrically spaced annular grooves defined therein configured to be spin welded to an interior surface of a fluid tank; and a fiber winding layer around an outer surface of the polymeric liner.

2. The fluid tank of claim 1, further comprising a backing ring inboard from the upper wall to provide support for the upper wall and the lower wall during welding, wherein the backing ring has a first end proximate the upper wall and a second end proximate the lower wall, the second end including at least one stop to engage a leading edge of the upper wall.

3. The fluid tank of claim 1, further comprising a flexible diaphragm positioned within the cavity connected to the inner diameter surface of the lower wall, the diaphragm separating the cavity into an upper portion and a lower portion, wherein the upper portion of the cavity is sealed to contain a pressurized gas and the lower portion is sealed to contain a pressurized fluid.

4. The fluid tank of claim 3, further comprising an inner hoop ring operatively connected to an inner surface of the flexible diaphragm to hold the flexible diaphragm in place against the lower wall.

5. The fluid tank of claim 4, wherein the lower wall includes a hoop groove that mates with the inner hoop ring to hold the flexible diaphragm therebetween.

6. The fluid tank of claim 1, further comprising an outer band having a hoop groove operatively connected to an outer diameter of the lower wall.

7. The fluid tank of claim 6, wherein the lower wall includes a hoop groove that mates with the hoop groove of the outer band.

8. The fluid tank of claim 1, wherein the connector includes a threaded member in the axial passage, wherein the threaded member projects outward from a first side of the connector housing, the threaded member having threading along an outer surface thereof.

9. The fluid tank of claim 8, further comprising an annular ring with at least one of a diaphragm support and a turbulator operatively connected to a second side of the connector housing opposite from the threaded member.

10. The fluid tank of claim 1, wherein the central collar defines an axial passage and includes a circumferential groove around its periphery for receiving fiber windings during assembly into the liner.

11. A fluid tank, comprising:
a polymeric liner comprising an upper wall and a lower wall, the upper wall and the lower wall defining a cavity therebetween, and the polymeric liner including an opening;
a weld joint that joins the upper wall to the lower wall; and
a connector positioned within the opening in the polymeric liner, the connector including:
a connector housing having a central collar that defines a longitudinal axis and a skirt that extends radially outward therefrom, wherein the central collar defines an axial passage, and wherein the central collar includes a circumferential groove around its periphery for receiving fiber windings during assembly into the liner;
a threaded member in the axial passage, wherein the threaded member projects outward from a first side of the connector housing; and
an annular ring operatively connected to a second side of the connector housing opposite from the threaded member.

12. The fluid tank of claim 11, wherein the weld joint is an infrared (IR) weld joint.

13. The fluid tank of claim 11, wherein the skirt of the connector housing includes an interface surface spin welded to an interior surface of the liner, the interface surface includes axially facing and concentrically spaced annular grooves defined therein configured to be spin welded to an interior surface of a fluid tank.

14. The fluid tank of claim 11, further comprising a backing ring inboard from the upper wall with respect to the cavity to provide support for the upper wall and the lower wall during welding, wherein the backing ring has first end proximate the upper wall and a second end proximate the lower wall, the second end including at least one stop to engage a leading edge of the upper wall.

15. The fluid tank of claim 11, wherein a leading edge of the upper wall and a leading edge of the lower wall extend beyond the IR weld joint to prevent the leading edges of the upper and lower walls from distorting during a welding process.

16. The fluid tank of claim 11, further comprising a flexible diaphragm positioned within the cavity connected to an inner diameter surface of the lower wall, the diaphragm separating the cavity into an upper portion and a lower portion, wherein the upper portion of the cavity is sealed to contain a pressurized gas and the lower portion is sealed to contain a pressurized fluid.

17. The fluid tank of claim 16, further comprising an inner hoop ring operatively connected to an inner surface of the flexiable diaphragm to hold the flexible diaphragm in place against the lower wall.

18. The fluid tank of claim 17, further comprising an outer band having a hoop groove operatively connected to an outer diameter of the lower wall, wherein the lower wall includes a hoop groove, and the hoop groove of the outer band mates with the hoop groove of the lower wall and the hoop groove of the lower wall mates with the inner hoop ring to hold the flexible diaphragm therebetween.

19. A fluid tank, comprising:
a polymeric liner including an upper wall having an opening and a lower wall, the upper wall and the lower wall defining a cavity therebetween, a portion of the upper wall being inboard the lower wall forming overlapping surfaces;
a connector positioned within the opening in the polymeric liner, the connector including a connector housing having a central collar that defines a longitudinal axis and a skirt inboard from the upper wall that extends radially outward from the central collar, wherein the central collar defines an axial passage;
an infared (IR) weld joint that joins the overlapping surfaces of the upper wall and lower wall;
a spin weld joint that joins an interface surface of the skirt to an interior surface of the upper wall, wherein the interface surface includes axially facing and concentrically spaced annular grooves defined therein configured to be spin welded to an interior surface of a fluid tank; and a fiber winding layer around an outer surface of the polymeric liner.

\* \* \* \* \*